United States Patent [19]
Heinemann et al.

[11] Patent Number: 5,519,750
[45] Date of Patent: May 21, 1996

[54] METHOD OF FORMING X-RAY IMAGES, AND DEVICE FOR CARRYING OUT THE METHOD

[75] Inventors: Hartmut Heinemann, Ahrensburg; Stephan Rupp, Besigheim, both of Germany

[73] Assignee: U.S. Philips Corporation, New York, N.Y.

[21] Appl. No.: 302,577

[22] Filed: Sep. 8, 1994

[30] Foreign Application Priority Data

Sep. 8, 1993 [DE] Germany .......................... 43 30 366.8

[51] Int. Cl.$^6$ .......................... B41M 5/20; G03G 15/054
[52] U.S. Cl. .............................................. 378/29; 378/32
[58] Field of Search ................................. 378/28, 29, 32

[56] References Cited

U.S. PATENT DOCUMENTS

| | | | |
|---|---|---|---|
| 5,077,765 | 12/1991 | Hillen et al. | 378/29 |
| 5,084,911 | 1/1992 | Sezan et al. | 378/96 |
| 5,093,851 | 3/1992 | Schafer | 378/29 |
| 5,097,493 | 3/1992 | Hillen et al. | 378/99 |
| 5,280,512 | 1/1994 | Maack et al. | 378/29 |
| 5,341,409 | 8/1994 | Conrads et al. | 378/29 |

FOREIGN PATENT DOCUMENTS 0456322 11/1991 European Pat. Off. .
3938096 5/1991 Germany .

*Primary Examiner*—David P. Porta
*Assistant Examiner*—David Vernon Bruce
*Attorney, Agent, or Firm*—Jack D. Slobod

[57] ABSTRACT

A method of and device for forming X-ray images in which a charge pattern corresponding to the X-ray intensity generated on the surface of a photoconductor is line-wise scanned by a number of probes which detect the charge in respective adjoining scanning zones of the photoconductor containing a plurality of lines eliminates stripes occurring in the line direction in the image. This is accomplished by: a) formation of correction values ($K_n(x,y_o)$) for the pixels of the image line ($y_o$) at the edges of the scanning zones of the probes (41), the absolute value and sign of the correction values being such that corrected image values ($B_{kn}(x,y_o)$) of the individual probes, resulting from the superposition of the correction values and image values ($B_n(x,y_o)$), correspond to the corrected image values of the respective neighboring probes; b) formation of intermediate values ($Z_n(x,y)$) for the image lines (y) situated between the edges of the scanning zones of the probes by interpolation of the correction values ($K_n(x,y_o)$; $K_n(x,y_u)$) associated with the same probe; and c) superposition of the correction values, or the intermediate values, and the image values in order to produce corrected image values for the image lines of the scanning zones.

14 Claims, 3 Drawing Sheets

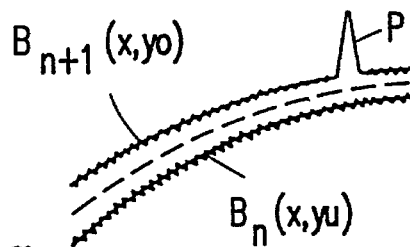

METHOD OF FORMING X-RAY IMAGES, AND DEVICE FOR CARRYING OUT THE METHOD

BACKGROUND OF THE INVENTION

1. Field of the Invention

The invention relates to a method of forming X-ray images, in which a charge pattern which corresponds to the X-ray intensity is generated on the surface of a photoconductor, which charge pattern is line-wise scanned by means of a number of probes which detect the charge in respective scanning zones of the photoconductor which adjoin one another and which comprise several lines, said probes supplying digital image values of the X-ray image which are dependent on the charge.

2. Description of the Related Art

A method of this kind is known from EP-OS 456 322, which corresponds to commonly-owned U.S. Pat. No. 5,093,851. Therein, the number of probes scanning the charge on the surface of the photoconductor is substantially smaller than the number of lines constituting an X-ray image. Consequently, each probe must successively scan a number of lines within the scanning zone assigned to the relevant probe on the surface of the photoconductor.

It has been found that at the transitions from one scanning zone to another edges occur in the line direction in the X-ray image due to small differences in brightness, which edges cannot be fully suppressed by the correction steps disclosed in the cited publication, so that a striped image impression is obtained.

SUMMARY OF THE INVENTION

It is an object of the invention to provide a method which is capable of substantially eliminating said edges as well as a device for carrying out the method.

A method of the kind set forth achieved this object in that it comprises the following steps:

a) formation of correction values for the pixels of the image lines at the edges of the scanning zones of the probes, the absolute value and sign of the correction values being such that the corrected image values of the individual probes, resulting from the superposition of the correction values and the image values, correspond to the corrected image values of the respective neighbouring probes;

b) formation of intermediate values for the image lines present between the edges of the scanning zones of the probes by interpolation of the correction values associated with the same probe;

c) superposition of the correction values, or the intermediate values, and the image values in order to produce corrected image values for the image lines of the scanning zones.

Thus, in accordance with the invention correction values are formed for the image lines at the edges of the scanning zones, which correction values are superposed on the image values for these image lines so that the superposition results in corrected image values having the same absolute value as the corrected image values for the scanning zone of the neighbouring probe.

However, the correction may not be limited to the lines at the edges, because otherwise jumps in brightness or disturbing edges, extending in the line direction, may occur within the scanning zones. Therefore, for the image lines between the edges intermediate values are calculated by interpolation of the correction values formed for the image lines at the edges of the scanning zone, which correction values are superposed on the image values of these image lines so that the correction itself cannot induce jumps in brightness.

The scanning zones of the individual probes can so in principle be chosen so that the scanning zones adjoin one another without having any line in common. In this case, however, jumps in brightness at the edges of the scanning zone which are produced by the object to be imaged and are not caused by deviating properties of the electrometer probes are also suppressed, so that the image is falsified. These falsifications can be prevented in a preferred version of the invention in that the probes are guided across the surface of the photoconductor in such a manner that the scanning zones of both probes overlap and that the correction values are always derived from the image values of an image line scanned by neighbouring probes. Thus, the correction values are derived from the image values of a line which is always scanned by two neighbouring probes (be it at different instants). In this case the correction values are dependent exclusively on the deviating properties of the probes, but not on the image contents.

It is to be noted that from DE-OS 39 38 096, which corresponds to commonly-owned U.S. Pat. No. 5,077,765 there is already known a method of the kind set forth in which in order to suppress the stripes the probes are guided in such a manner that neighbouring probes scan the same line in space at different instants. By comparison of the image values supplied for this line by the neighbouring probes the relative sensitivities of the probes are determined. Subsequently, in order to remove the stripes from the image the image values supplied by the individual probes are multiplied by the sensitivity quotients thus determined. If the sensitivity of the probes is not exactly determined, this method produces too large or too small image values for the whole scanning zone, and this error is propagated to the image areas scanned by the subsequent probes. In accordance with the invention, however, when a correction value is incorrectly determined for an image line at the edge of a scanning zone, falsification occurs only for this scanning zone; moreover, this falsification is less as the individual lines are more remote from the line at the edge.

In practice it cannot always be achieved that two neighbouring probes (at different instants) scan exactly the same line, i.e. the same line-shaped area of the photoconductor. A given offset (perpendicular to the line direction) is liable to occur between these lines. This offset becomes apparent in that, like in a device in which neighbouring probes do not scan a common line, signal peaks occur in these lines or in the difference derived therefrom. Due to the correction method, these signal peaks cause image falsification also in other lines. This falsification can be at least partly suppressed by suppressing the effect of signal peaks in the image lines at the edges of the scanning zone prior to the formation of the correction values, preferably by way of a median filtering operation in the line direction.

In a preferred version of the invention, the correction values are formed so that the correction values of neighbouring probes have the same absolute value but the opposite sign for the same pixel or for neighbouring pixels. In this version the image information is least affected by the correction.

A device for carrying out the method of the invention, comprising a photoconductor on the surface of which a charge pattern corresponding to the local X-ray intensity is generated, a number of probes which scan the charge line-wise in a respective scanning zone on the surface of the photoconductor and supply electric signals which are dependent on the charge on the surface, and also comprising means for converting the signals into image values which are dependent on the charge in the pixels, is characterized in that it comprises a) means for forming correction values for the pixels of the image lines at the edges of the scanning zones of the probes, the absolute value and sign of the correction values being such that the corrected image values of the individual probes resulting from the superposition of the correction values and the image values correspond to the corrected image values of the respective neighbouring probes, b) means for forming intermediate values for the image lines situated between the edges of the scanning zones of the probes by interpolation of the correction values associated with the same probe, c) means for superposing the correction values, or the intermediate values, and the image values in order to produce corrected image values for the image lines of the scanning zones.

BRIEF DESCRIPTION OF THE DRAWING

The invention will be described in detail hereinafter with reference to the drawing. Therein:

FIGS. 2a to 2c show the variation of various signals perpendicularly to the line direction, FIGS. 3a to 3c show the variation of various signals in the line direction.

DETAILED DESCRIPTION OF THE PREFERRED EMBODIMENTS

Figure 1:
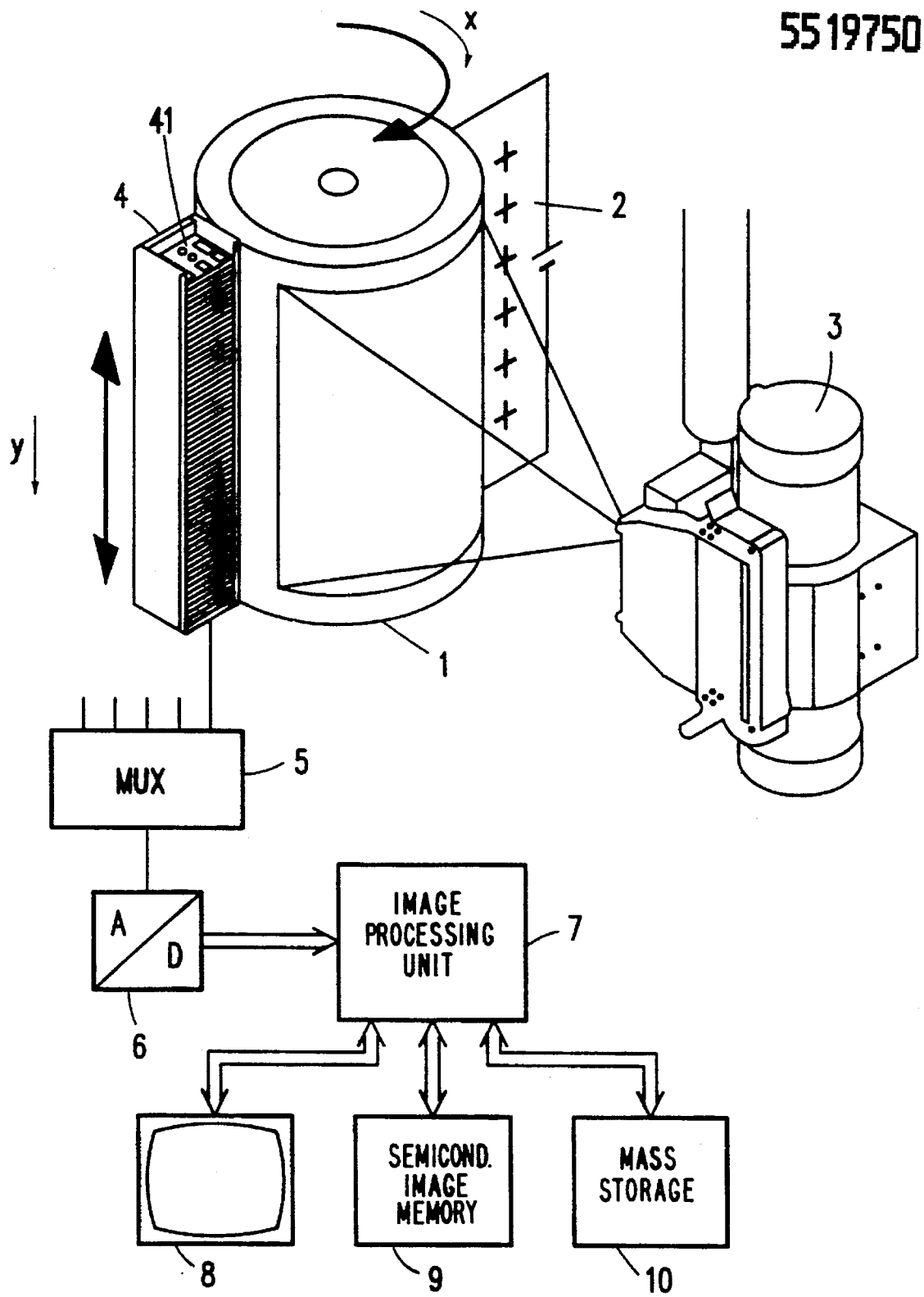
FIG. 1 shows a device for carrying out the method of the invention.

The reference numeral 1 in FIG. 1 denotes a selenium drum, i.e. a cylindrical metal body whose cylindrical surface is covered with a photoconductor consisting of amorphous selenium. The selenium layer may have a thickness of approximately 0.5 mm. Prior to an X-ray exposure, the selenium layer is charged by way of a corona as is diagrammatically denoted by the reference 2, so that a strong electric field is built up in the selenium.

During X-ray exposure of a patient (not shown) by means of an X-ray source 3, X-ray photons are absorbed in the selenium layer, so that charge carriers are released. These free charge carriers travel to the surface of the selenium layer under the influence of the electric field and neutralize a part of the previously applied charge on this surface. Depending on the local radiation intensity, the surface charge is depleted more or less. The X-ray exposure thus results in a latent image in the form of a charge pattern on the selenium surface.

The X-ray image thus formed is scanned by a read unit 4 which is arranged to the side of the selenium drum 1 and which comprises a number of probes 41. The probes are offset in the axial direction of the selenium drum 1 and are arranged at a uniform distance from one another in such a manner that they extend across the entire axial dimension of the charge pattern produced by the X-ray exposure. In FIG. 1 only the upper probe 41 (with the associated electronics).

In FIG. 1 only an edge of the supporting substrate of the other probes is visible.

For reading, the selenium drum is accelerated to a comparatively high rotary speed, each probe then scanning a line-shaped part of the charge pattern in the circumferential direction of the drum. The line direction will also be referred to hereinafter as the x-direction. Because the number of lines in which the charge pattern is to be scanned, for example 2048, is substantially larger than the number of probes, each probe must successively scan a number of lines within the scanning zone assigned to the relevant probe. To this end, the read unit 4 with the probes is displaced in the axial direction of the drum (referred to as the y-direction hereinafter) during rotation of the drum, in such a manner that after one complete revolution of the drum the read unit has been shifted over the width of a line or a pixel. As a result, the lines describe a part of a helix whose pitch, however, is so small that it coincides substantially with the circumferential direction of the drum. The displacement of the read unit is proportioned so that the probes 41 in the end scan a line which has already been scanned (as the first one) by a neighbouring probe.

The analog electric signals generated by the probes in the read unit 4 are applied, via an analog multiplexer 5 and an analog-to-digital converter 6, to an image processing unit 7 which is coupled to a monitor 8 for the display of the X-ray image, to a fast semiconductor image memory 9, and to mass storage 10 having a storage capacity which is large in comparison with that of the memory 9. The image processing unit 7 comprises a suitably programmed computer, possibly in conjunction with a digital signal processor.

The device of FIG. 1 as described thus far is known from EP-OS 456 322.

After the entire charge pattern has been scanned, the X-ray image is stored in the image memory 9. Subsequently, the image undergoes a series of operations during which inter alia the different sensitivities of the probes as well as, for example the dark discharge of the image are taken into account. Despite the processing steps, such an image usually exhibits jumps in brightness at the transitions between the scanning zones, which jumps lead to a striped image impression. These brightness jumps are shown in FIG. 2a, be it in exaggerated form, this Figure shows the variation of the brightness (or the image values) along a column extending in the axial direction on the drum 1. The reference x denotes the line direction and y denotes the column direction perpendicular thereto. $B(x_i, y)$ thus denotes the variation of the image values along the column denoted by $x=x_i$. It appears from FIG. 2a that the brightness varies continuously within a scanning zone, whereas at the transition from one scanning zone to another the brightness varies abruptly. Because the scanning of the charge pattern is performed in such a manner that the last line of the scanning zone of one probe coincides in space with the first line of the neighbouring probe, two image values are obtained for this line.

The correction method for suppressing these brightness jumps and the associated striped appearance of the image can be summarized as correction values being formed for the lines at the edges of the scanning zones (i.e. for the lines which are scanned as the last one by one probe and as the first one by the neighbouring probe). These correction values are equal and opposed and generally so large that their superposition on the image values, i.e. their addition to or subtraction from the image values, results in values which form the arithmetical mean value of the image values in the relevant lines and which are denoted by dots in FIG. 2a. In order to enable adaptation of the image values for the intermediate lines to the corrected values, intermediate values $Z(x_i,y)$ are formed from the correction values determined for the upper and the lower line of a scanning zone so that the intermediate values vary continuously from one correction value to another. The correction values, or the intermediate values derived therefrom, are shown in FIG. 2b. It appears that the intermediate values vary linearly in the column direction. When the variation of the intermediate values $Z(x_i,y)$ according to FIG. 2b is added to the image values $B(x_i,y)$, corrected image values $B_k(x_i,y)$ in conformity with FIG. 2c are obtained.

The image thus corrected no longer contains jumps. The image information is affected as little as possible by this correction.

Figure 4:
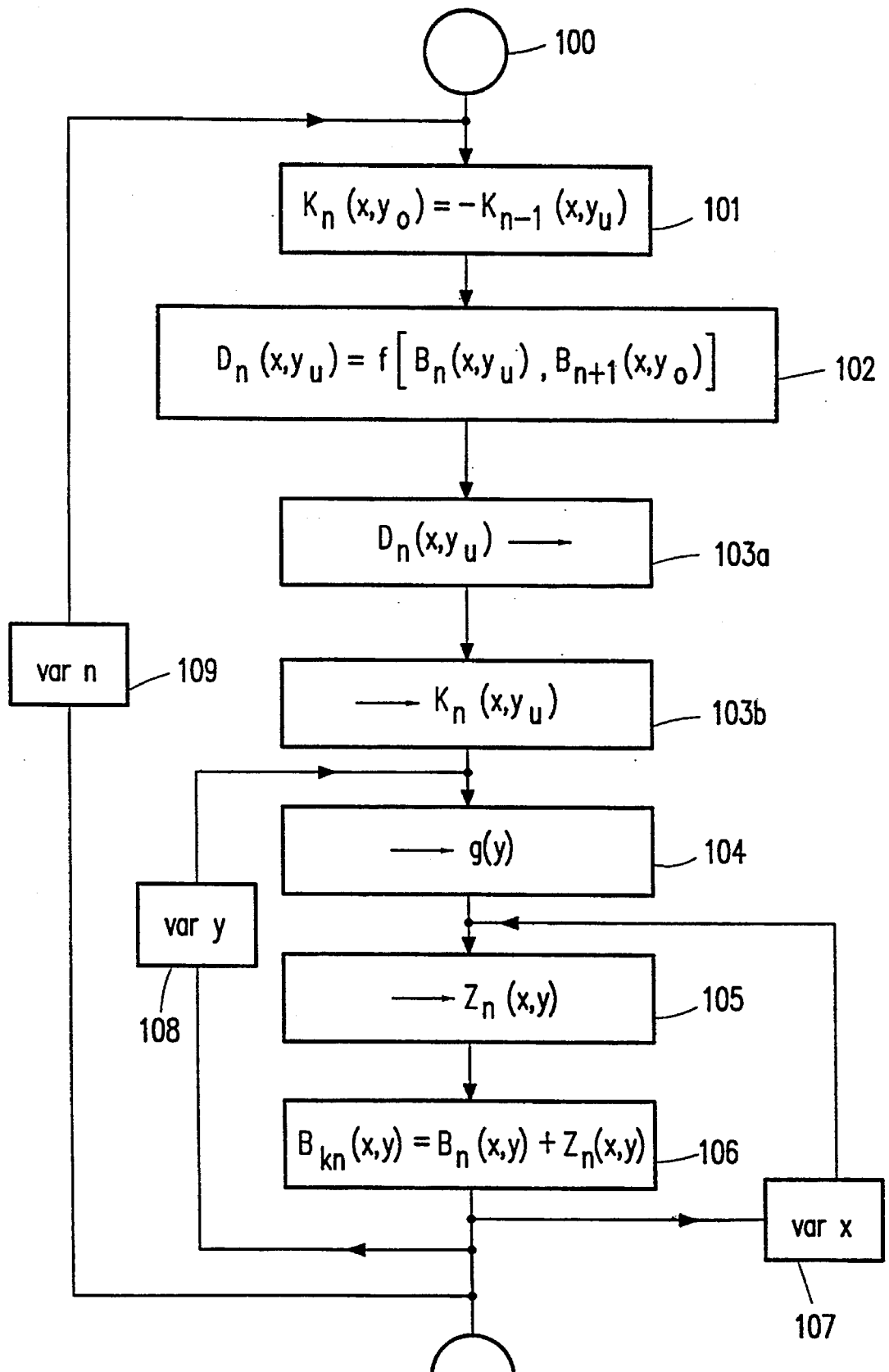
FIG. 4 shows a flow chart illustrating the program for carrying out the method of the invention.

The correction of the image values in order to eliminate the stripe-shaped artifacts in the image will be described in detail hereinafter with reference to the flow chart shown in FIG. 4. Block 100 symbolizes the preceding processing steps, whereas the blocks 101 . . . 106 form a program section which is executed as many times as there are probes present in the read unit 4 (for example, 36 times). The blocks explain the correction of the image values acquired by means of the $n^{th}$ probe, n being between 2 and, for example 36. In this respect it is assumed that for the last line (the last line of a scanning zone will be referred to hereinafter as $y_u$) of the preceding probe n-1 correction values $K_{n-1}(x,y_u)$ have already been calculated. For the subsequent probe n and its first line ($y_o$), presumably having the same position in space as the last line $y_u$ of the preceding probe n-1, the following equation then holds:

$$K_n(x,y_o) = -K_{n-1}(x,y_u) \quad (1)$$

This is because, as has already been stated, the correction values of neighbouring probes are equal and opposite for the same line in space. This step is carried out in the block 101.

In order to determine the correction values for the last line ($y_u$) of the probe n, in the block 102 a value $D_n(x,y_u)$ is calculated in conformity with the equation:

$$D_n(x,y_u) = 0.5 \cdot [B_{n+1}(x,y_o) - B_n(x,y_u)] \quad (2)$$

Therein, $B_{n+1}(x,y_o)$ represents the image values supplied by the next probe n+1 for its first line $y_o$ and $B_n(x,y_u)$ represents the image values of the last line of the $n^{th}$ probe, it again being assumed that the last line of the probe n is the same as the first line of the subsequent probe n+1. In principle in many cases it would suffice when correction values were determined only for a number of points and if further correction values were derived therefrom by interpolation or the like. However, because correction must take place for each pixel of a scanning zone, it is simplest to take into account all image values of this line because they are available anyway.

FIG. 3a shows the variation of the image values of the probes n and n+1 for this line. It appears that the variation of the image values for this line is not identical; this should be the case if the probes were identical and were to scan a line having an identical position in space. It also appears that the variation of the image values of the probe n+1 exhibits a narrow peak P at the area $x_1$, whereas the probe n does not exhibit a similar variation for this part of the image line. However, both probes exhibit a corresponding peak at the area $x_2$.

FIG. 3b shows, at an increased scale, the variation of $D_n(x,y_o)$ calculated therefrom in conformity with the equation (2). It appears that the peaks at $x_2$ have been eliminated, whereas the peak at $x_1$ remains. This jump-like variation of the difference in a small part of the line, which can occur whenever the line scanned by the probe n+1 does not have the same position as the line $y_u$ scanned by the probe n, would propagate across the entire scanning zone if it were taken into account in the formation of the correction value. Therefore, during a first step (103a) the peaks in the line $D_n(x,y_u)$ are suppressed. Preferably, to this end use is made of a median filter having a core size which corresponds at least to the maximum peak width to be expected, this filter is applied across the line $D_n(x,y_u)$. In this manner first all peaks are removed.

Subsequently, during a next step (103b) the line $D_n(x,y_u)$ is subjected to a linear low-pass filtering operation in the x-direction, the core may then be substantially larger than during the foregoing median filtering operation. As a result, high-frequency irregularities (noise) on the line $D_n$ are smoothed. In the simplest case this low-pass filtering operation can take place by replacing each value of the series $D_n(x,y_u)$ by the arithmetical mean value of this value and the corresponding values for a number of neighbouring pixels.

These two filtering operations produce the correction values $K_n(x,y_u)$ having a smoothed variation as shown in FIG. 3c.

After the correction values $K_n(x,y_o)$ and $K_n(x,y_u)$ for the upper line $y_o$ and the lower line $y_u$ of the scanning zone of the $n^{th}$ probe have thus been determined, intermediate values are successively determined for the lines situated between these lines and within the scanning zone, which intermediate values are superposed on the image values determined at that area. These intermediate values result from the correction values of the edge lines of the scanning zone by a preferably linear interpolation in conformity with the distance between the relevant line and the two other lines. For each line y, therefore, in conformity with the equation $$g = (y - y_o)/(y_u - y_o) \quad (3)$$

there is obtained an interpolation factor g which is determined in the block 104.

Using this interpolation factor, in the block 105 an intermediate value is calculated for the first pixel (x=1) of the line y in conformity with the equation $$Z_n(x,y) = (1-g) \cdot K_n(x,y_o) + g \cdot K_n(x,y_u) \quad (4)$$

The intermediate value thus calculated is added to the image value for the same pixel (block 106) in conformity with the equation $$B_{kn}(x,y) = B_n(x,y) + Z_n(x,y) \quad (5)$$

Therein, $B_{kn}(x,y)$ represents the corrected image value replacing the image value $B_n(x,y)$. Using the same interpolation factor, the steps 105 and 106 are repeated for all other pixels x of the line y (block 107), so that ultimately the line y has been corrected.

Subsequently another line is applied (block 108) and for this new line a new interpolation factor g is calculated (block 104). Using these new interpolation values, for the new line y new intermediate values are calculated (in the block 105) in conformity with the equation (4), so as to be added to the image values of this line (block 106) in conformity with the equation (5). When the line $y=y_u$ is reached, the interpolation factor g assumes the value 1 and for this line $Z_n(x,y_u) = K_n(x,y_u)$ in conformity with the equation (4), i.e. for this line the intermediate value is identical to the correction value for this line. FIG. 3a denotes, by way of a dashed line, the variation of the corrected image values $B_{kn}(x,y_u)$ for this line.

After a corrected image value $B_{kn}$ has been calculated in this manner for all pixels of all lines of the scanning zone of the probe n, the steps 101 to 108 are repeated for the next probe (n+1), the indices of B and Z then being increased by 1 (block 109). As has been described with reference to block 101, the correction values for the first line $y_o$ of the probe n+1 can be simply determined from the correction values of the $n^{th}$ probe for the lowest line $y_u$ thereof. The correction values for the lowest line of the scanning zone of the probe n+1 are determined in conformity with the block 102 and 103. After the relevant step has been repeated for all probes (where, as a deviation from the block 102 and 103, the correction values of the last line are assumed to be zero for the last probe), an image has been obtained in which the described stripes have been substantially completely eliminated, without causing excessive modification of the image information.

We claim:

1. A method of forming X-ray images, in which a charge pattern which corresponds to the X-ray intensity is generated on the surface of a photoconductor, which charge pattern is line-wise scanned by means of a number of probes which detect the charge in respective scanning zones of the photoconductor which adjoin one another and which comprise several lines, said probes supplying digital image values ($B_n(x,y)$) of the X-ray image which are dependent on the charge, comprising the following steps:
   a) formation of correction values ($K_n(x,y_o)$) for the pixels of the image lines ($y_o$) at the edges of the scanning zones of the probes, the absolute value and sign of the correction values being such that the corrected image values ($B_{kn}(x,y_o)$) of the individual probes, resulting from the superposition of the correction values and the image values ($B_n(x,y_o)$), correspond to the corrected image values of the respective neighbouring probes;
   b) forming of intermediate values ($Z_n(x,y)$) for the image lines (y) situated between the edges of the scanning zones of the probes by interpolation of the correction values ($K_n(x,y_o)$; $K_n(x,y_u)$) associated with the same probe; and
   c) superposing the correction values, or the intermediate values and the image values in order to produce corrected image values for the image lines of the scanning zones.

2. A method as claimed in claim 1, characterized in that the correction values are formed so that the correction values of neighbouring probes have the same absolute value but the opposite sign for the same pixel or for neighbouring pixels.

3. A method as claimed in claim 1, characterized in that the correction values are formed so that the correction values of neighbouring probes have the same absolute value but the opposite sign for the same pixel or for neighbouring pixels.

4. A method as claimed in claim 1, characterized in that a low-pass filtering operation is performed in the line direction before the correction values, or the intermediate values derived therefrom, are used to form corrected image values.

5. A method as claimed in claim 4, characterized in that the correction values are formed so that the correction values of neighbouring probes have the same absolute value but the opposite sign for the same pixel or for neighbouring pixels.

6. A method as claimed in claim 1, characterized in that prior to forming the correction values the effect of signal peaks (P) in the image lines ($y_u$, $y_o$) at the edges of the scanning zone is suppressed, preferably by way of a median filtering operation in the line direction.

7. A method as claimed in claim 6, characterized in that a low-pass filtering operation is performed in the line direction before the correction values, or the intermediate values derived therefrom, are used to form corrected image values.

8. A method as claimed in claim 6, characterized in that the correction values are formed so that the correction values of neighbouring probes have the same absolute value but the opposite sign for the same pixel or for neighbouring pixels.

9. A method as claimed in claim 1, characterized in that the probes are guided across the surface of the photoconductor in such a manner that the scanning zones of both probes overlap and that the correction values are always derived from the image values of an image line ($y_o$ or $y_u$) scanned by neighbouring probes.

10. A method as claimed in claim 9, characterized in that a low-pass filtering operation is performed in the line direction before the correction values, or the intermediate values derived therefrom, are used to form corrected image values.

11. A method as claimed in claim 9, characterized in that prior to forming the correction values the effect of signal peaks (P) in the image lines ($y_u$, $y_o$) at the edges of the scanning zone is suppressed, preferably by way of a median filtering operation in the line direction.

12. A method as claimed in claim 11, characterized in that a low-pass filtering operation is performed in the line direction before the correction values, or the intermediate values derived therefrom, are used to form corrected image values.

13. A method as claimed in claim 11, characterized in that the correction values are formed so that the correction values of neighbouring probes have the same absolute value but the opposite sign for the same pixel or for neighbouring pixels.

14. A device for forming X-ray images, comprising a photoconductor having a surface for generating thereon a pattern of charge corresponding to pixels in an image in response to local X-ray intensity, a number of probes for scanning the charge line-wise in a respective scanning zone on the surface of the photoconductor and for supplying electric signals which are dependent on the charge on the surface, and also comprising means for converting the signals into image values which are dependent on the charge in the pixels, characterized in that it further comprises:
   a) means for forming correction values ($K_n(x,y_o)$) for the pixels of the image lines ($y_o$) at the edges of the scanning zones of the probes, the absolute value and sign of the correction values being such that the corrected image values ($B_{kn}(x,y_o)$) of the individual probes, resulting from the superposition of the correction values and the image values ($B_n(x,y_o)$), correspond to the corrected image values of the respective neighbouring probes;
   b) means for forming intermediate values ($Z_n(x,y)$) for the image lines (y) situated between the edges of the scanning zones of the probes by interpolation of the correction values ($K_n(x,y_o)$, $K_n(x,y_u)$) associated with the same probe; and
   c) means for superposing the correction values, or the intermediate values, and the image values in order to produce corrected image values for the image lines of the scanning zones.

* * * * *